United States Patent

US 6,916,854 B2
Schwalm et al.
(45) Date of Patent: *Jul. 12, 2005

(54) UNSATURATED COMPOUNDS CONTAINING CARBAMATE TERMINAL GROUPS OR UREA TERMINAL GROUPS

(75) Inventors: Reinhold Schwalm, Wachenheim (DE); Uwe Meisenburg, Duisburg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/471,598

(22) PCT Filed: Mar. 20, 2002

(86) PCT No.: PCT/EP02/03280

§ 371 (c)(1),
(2), (4) Date: Sep. 23, 2003

(87) PCT Pub. No.: WO02/086000

PCT Pub. Date: Oct. 31, 2002

(65) Prior Publication Data

US 2004/0097642 A1 May 20, 2004

(30) Foreign Application Priority Data

Mar. 23, 2001 (DE) .......................... 101 14 689

(51) Int. Cl.⁷ .............................................. C08G 18/62
(52) U.S. Cl. ...................... 522/94; 526/300; 525/157
(58) Field of Search ...................... 522/94; 526/300; 525/157

(56) References Cited

U.S. PATENT DOCUMENTS

| 4,138,299 A | | 2/1979 | Bolgiano |
| 4,173,682 A | | 11/1979 | Noomen et al. |
| 4,415,604 A | | 11/1983 | Nativi |
| 5,075,384 A | | 12/1991 | DuPont et al. |
| 5,523,443 A | | 6/1996 | Gaglani et al. |
| 5,770,650 A | | 6/1998 | McGee et al. |
| 6,235,858 B1 | * | 5/2001 | Swarup et al. .............. 526/301 |
| 6,777,090 B2 | * | 8/2004 | Baumgart et al. ....... 428/423.1 |
| 2004/0068028 A1 | * | 4/2004 | Baumgart et al. .......... 522/148 |

FOREIGN PATENT DOCUMENTS

| DE | 26 31 949 | 1/1978 |
| EP | 0 549 116 | 6/1993 |
| EP | 0 618 244 | 10/1994 |
| EP | 0 832 950 | 4/1998 |
| EP | 0 844 286 | 5/1998 |
| FR | 2 393 827 | 1/1979 |
| WO | 92 20724 | 11/1992 |
| WO | 01 46285 | 6/2001 |

* cited by examiner

*Primary Examiner*—Rachel Gorr
(74) *Attorney, Agent, or Firm*—Oblon, Spivak, McClelland, Maier & Neustadt, P.C.

(57) ABSTRACT

The invention relates to a compound containing at least one unsaturated, radically or cationically polymerizable group and at least one carbamate terminal group or urea terminal group.

18 Claims, No Drawings

UNSATURATED COMPOUNDS CONTAINING CARBAMATE TERMINAL GROUPS OR UREA TERMINAL GROUPS

BACKGROUND OF THE INVENTION

1. Field of the Invention

The invention relates to unsaturated compounds containing carbamate or urea end groups and to their use in dual cure systems.

2. Description of the Background

The feature of dual cure systems is that they are curable by means of two independent curing mechanisms, e.g., radiation curing, moisture curing, oxygenated curing or thermal curing. There is a particular desire for systems which following the application of the coating composition may be precured by very short exposure to UV light to give a flexible film which is dust-dry. This film should then either be thermally postcurable or should continue to cure just on storage in air over the course of a few days until a hard film has formed which has the final desired service properties. This type of two-stage curing is of particular importance since it allows the processors of the coating systems to coat an article with a film in a first workstep and in a second step to process said film further, in particular to give the ready-coated and irradiated article a certain profile using pressure. At the time of their deformation in the second workstep, therefore, the films or sheets must have already undergone initial curing, so that they do not stick to the tools in the course of deformation; on the other hand, however, they must not already be so hard that they tear when stretched and deformed.

The phrase "dual cure" refers in accordance with the invention to a curing process which takes place by way of at least two mechanisms, namely radiation, moisture, oxidative and/or thermal curing.

Dual cure coatings which are photochemically polymerizable and possess a secondary curing mechanism, by way of alkoxysilane groups, for example, are known from U.S. Pat. No. 5,523,443; such structures may also contain carbamate linkages. Said document describes polymerizable systems which can be cured both by ultraviolet exposure and by way of a further mechanism. These systems consist of an alkoxysilyl-urethane(meth)acrylate and a (meth)acrylate or vinyl ether as reactive diluent.

Moreover, U.S. Pat. No. 5,075,384 discloses unsaturated carbamates obtained by reacting unsaturated isocyanates with the hydroxyl groups of styrene-allyl alcohol copolymers. The carbamate groups that have formed serve merely as linkers for the introduction of unsaturated groups. The systems described therein are curable by UV and dry oxidatively.

Further documents, examples being U.S. Pat. Nos. 4,138,299, 4,173,682, 4,415,604, and EP-A 549 116, describe resins which can be cured by means of radiation and atmospheric moisture. Both the oxidative drying and the air curing, however, are very slow processes which proceed in an uncontrolled fashion.

U.S. Pat. No. 4,138,299 describes a radiation- and moisture-curable coating system composed of 15–60% by weight of acrylate as reactive diluent and 40–85% by weight of an isocyanate-terminated prepolymer formed by reacting polyesterdiols and -triols with aliphatic diisocyanates, 5–15% of the available isocyanate groups being reacted with hydroxy acrylates.

U.S. Pat. No. 4,173,682 describes a method of coating a substrate with a radiation- and moisture-curable coating comprising an isocyanato-containing adduct of a (meth) acrylic acid hydroxy ester and a polyisocyanate, a polyfunctional hydroxy compound, and a photoinitiator. The components may not be combined until shortly before application in order to prevent unwanted hardening.

U.S. Pat. No. 4,415,604 describes a UV- and moisture-curable coating composition comprising a polyetherdiol or -triol containing isocyanate end groups, a (meth)acrylate as reactive diluent, and a polymerization initiator.

EP-A 549 116 describes a dual cure composition which comprises reactive diluents and an isocyanate adduct that carries free isocyanate groups and free, photopolymerizable, ethylenically unsaturated groups.

Unsaturated isocyanato acrylates of this kind which contain not only the photochemically curable acrylate groups but also free isocyanates are, however, not stable on storage or else must be stored in the absence of moisture, which is awkward.

EP-A 844 286 describes a powder coating system for powder coating materials that comprises not only a UV free-radical initiator but also an initiator which can be activated thermally. This text remarks that liquid systems based on thermal peroxide initiators only have relatively short storage lives.

Moreover, systems which cure by means of heat alone and which crosslink by way of carbamates or ureas are known—from U.S. Pat. No. 5,770,650 for example. U.S. Pat. No. 5,770,650 describes a curable composition containing carbamate or urea and ester or amide groups and a curing reagent. The possibility of a UV cure is not contemplated.

Also known are unsaturated isocyanato acrylates which in addition to the photochemically curable acrylate groups also contain free isocyanates. However, such binders lack storage stability.

More stable on storage are the radiation-curable and thermally curable binders known from DE-A 26 31 949, containing blocked polyisocyanates. DE-A 26 31 949 describes radiation-curable binders which comprise a blocked polyisocyanate, in the form of oxime, malonate, acetoacetate, caprolactone, phenol, etc. The coating films that have formed receive a thermal aftertreatment. The manner of thermal crosslinking described therein, which involves the reelimination of isocyanates, is not always unproblematic, however, with regard to the elimination products that form (e.g., pyrazoles, triazoles), some of which remain in the film and act, for example, as plasticizers. Consequently, there continues to be a need for alternative crosslinking mechanisms.

SUMMARY OF THE INVENTION

It is an object of the present invention to provide dual cure systems for radiative and thermal curing which are stable on storage and which in condensation reactions release only volatile elimination products.

We have found that this object is achieved with compounds containing at least one unsaturated free-radically or cationically polymerizable group and at least one carbamate and/or urea end group.

DETAILED DESCRIPTION OF THE PREFERRED EMBODIMENTS

The number-average molecular weight, $M_n$, of these compounds, determined by gel permeation chromatography using tetrahydrofuran as eluent and polystyrene as standard, may amount, for example, to between 200 and 200 000, preferably between 250 and 100 000, with particular preference between 350 and 50 000, and in particular between 500 and 30 000 g/mol.

The amount of unsaturated free-radically or cationically polymerizable groups per 100 g of compound may, for example, amount to at least 0.01 mol, perferably at least 0.05 mol, with particular preference at least 0.1 mol, and in particular at least 0.2 mol.

The amount of carbamate and/or urea end groups per 100 g of compound may amount, for example, to at least 0.01 mol, preferably at least 0.05 mol, with particular preference at least 0.1 mol, and in particular at least 0.2 mol.

The free-radically or cationically polymerizable groups and the carbamate and/or urea end groups may be connected to one another arbitrarily; they may be attached, for example, to addition polymers, polycondensates or polyadducts.

These may, for example, be polymers or copolymers of monomers that are known per se, polyesters, polyamides, polyimides, polyurethanes, polyureas, polyepoxides or polyethers.

Monomers from which polymers or copolymers may be constructed include, for example, esters of (meth)acrylic acid with alcohols of from 1 to 20 carbon atoms, e.g., methyl(meth)acrylate, ethyl (meth)acrylate, butyl(meth) acrylate, 2-ethylhexyl (meth)acrylate, vinylaromatic compounds, e.g., styrene, divinylbenzene, $\alpha,\beta$-unsaturated nitriles, e.g., acrylonitrile, methacrylonitrile, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, iso-butene, cyclic monounsaturated compounds, e.g., cyclopentene, cyclohexene, cyclododecene, n-vinylformamiade, allylacetic acid, vinylacetic acid, monoethylenically unsaturated carboxylic acids of from 3 to 8 carbon atoms and their water-soluble alkali metal salts, alkaline earth metals salts or ammonium salts, examples being acrylic acid, methacrylic acid, dimethylacrylic acid, ethacrylic acid, maleic acid, citraconic acid, methylenemalonic acid, crotonic acid, fumaric acid, mesaconic acid, and itaconic acid, maleic acid, N-vinylpyrrolidone, N-vinyllactams, such as N-vinylcaprolactam, N-vinyl-N-alkylcarboxamide or N-vinylcarboxamides, such as N-vinylacetamide, N-vinyl-N-methylformamide and N-vinyl-N-methylacetamide, vinyl ethers, e.g., methyl vinyl ether, ethyl vinyl ether, n-propyl vinyl ether, iso-propyl vinyl ether, n-butyl vinyl ether, sec-butyl vinyl ether, iso-butyl vinyl ether, tert-butyl vinyl ether, 4-hydroxy butyl vinyl ether, and mixtures thereof.

Preference is given to the free-radically or cationically polymerizable groups and the carbamate or urea end groups being attached to polyurethanes.

The polyurethanes (A) of the invention comprise as constituent components substantially:

a) at least one organic aliphatic, aromatic or cycloaliphatic di- or polyisocyanate,
b) at least one compound containing at least one isocyanate-reactive group and at least one free-radically polymerizable unsaturated group and/or a cationically polymerizable group,
c) at least one compound containing at least one isocyanate-reactive group and a carbamate or urea end group,
d) if desired, at least one compound containing at least one isocyanate-reactive group and at least one dispersing group,
e) if desired, at least one compound containing at least two isocyanate-reactive groups, and
f) if desired, compounds other than a) to d) containing at least one isocyanate-reactive group.

Further polyurethanes of the invention additionally comprise as component (B) at least one compound containing at least one group that can crosslink with the carbamate groups. We have found that the object mentioned earlier is likewise achieved by aqueously processible polyurethane dispersions essentially comprising (A) a polyurethane wherein component d) is present and
(B) at least one compound containing at least one group that can crosslink with the carbamate groups,
(C) if desired, one or more initiators which can be activated photochemically and/or thermally, and
(D) if desired, further typical coatings additives.

The compounds (B), (C), and (D) may also be added to the polyurethanes if the desire is to provide coating formulations for preparing dual cure coating materials.

Examples of suitable components a) include aliphatic, aromatic and cycloaliphatic di- and polyisocyanates having an NCO functionality of at least 1.8, preferably from 1.8 to 5, and with particular preference from 2 to 4, and also their isocyanates, biruets, allophanates, and uretdiones.

The diisocyanates preferably comprise isocyanates of from 4 to 20 carbon atoms. Examples of customary diisocyanates are aliphatic diisocyanates such as tetramethylene diisocyanate, hexamethylene diisocyanate(1,6-diisocyanatohexane), octamethylene diisocyanate, decamethylene diisocyanate, dodecamethylene diisocyanate, tetradecamethylene diisocyanate, lysine diisocyanate derivatives, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl) cyclohexane or 2,4- or 2,6-diisocyanato-1-methylcyclohexane, and also aromatic diisocyanates such as 2,4- or 2,6-tolylene diisocyanate and isomer mixtures thereof, m- or p-xylylene diisocyanate, 2,4'- or 4,4'-diisocyanatodiphenylmethane and isomer mixtures thereof, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanato benzene or diphenyl ether 4,4'-diisocyanate.

Mixtures of said diisocyanates may also be present.

Preference is given to hexamethylene diisocyanate, 1,3-bis(isocyanatomethyl)cyclohexane, isophorone diisocyanate, and di(isocyanatocyclohexyl)methane.

Suitable polyisocyanates include polyisocyanates containing isocyanurate groups, uretdione diisocyanates, polyisocyanates containing biuret groups, polyisocyanates containing urethane or allophanate groups, polyisocyanates containing oxadiazinetrione groups, uretonimine-modified polyisocyanates of linear or branched $C_4$–$C_{20}$-alkylene diisocyanates, cycloaliphatic diisocyanates having a total of 6 to 20 carbon atoms or aromatic diisocyanates having a total of 8 to 20 carbon atoms, or mixtures thereof.

The di- and polyisocyanates which can be used preferably have an isocyanate group content (calculated as NCO, molecular weight=42) of from 10 to 60% by weight, based on the di- and polyisocyanate (mixture), more preferably from 15 to 60% by weight, and with particular preference from 20 to 55% by weight.

Preference is given to aliphatic and/or cycloaliphatic di- and polyisocyanates, examples being the aliphatic and cycloaliphatic diisocyanates mentioned above, or mixtures thereof.

Preference is further given to
1) Polyisocyanates of aromatic, aliphatic and/or cycloaliphatic diisocyanates, containing isocyanurate groups. Particular preference is given here to the corresponding aliphatic and/or cycloaliphatic isocyanato isocyanurates and particularly to those based on hexamethylene diisocyanate and isophorone diisocyanate. The present isocyanurates particularly comprise trisisocyanatoalkyl and trisisocyanatocycloalkyl isocyanurates, which represent cyclic trimers of the diisocyanates, or comprise mixtures with their higher homologs containing more than one isocyanurate ring. The isocyanato isocyanurates generally have an NCO content of from 10 to 30% by weight, in particular from 15 to 25% by weight, and an average NCO functionality of from 3 to 4.5.
2) Uretdione diisocyanates containing aromatically, aliphatically and/or cycloaliphatically bonded isocyanate groups, preferably aliphatically and/or cycloaliphatically bonded isocyanate groups, and being derived in particular from hexamethylene diisocyanate or isophorone diisocyanate. Uretdione diisocyanates are cyclic dimerization products of diisocyanates. In the formulations of the invention, the uretdione diisocyanates may be used as the sole component or in a mixture with other polyisocyanates, especially those specified under 1).
3) Polyisocyanates containing biuret groups and aromatically, cycloaliphatically or aliphatically bonded, preferably cycloaliphatically or aliphatically bonded isocyanate groups, especially tris(6-isocyanatohexyl)biuret or its mixtures with its higher homologs. These polyisocyanates containing biruet groups generally have an NCO content of from 18 to 22% by weight and an average NCO functionality of from 3 to 4.5.
4) Polyisocyanates containing urethane and/or allophonate groups and aromatically, aliphatically or cycloaliphatically bonded isocyanate groups, preferably aliphatically or cycloaliphatically bonded isocyanate groups, such as may be obtained, for example, by reacting excess amounts of hexamethylene diisocyanate or of isophorone diisocyanate with polyhydric alcohols such as trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane or mixtures thereof. These polyisocyanates containing urethane and/or allophonate groups generally have an NCO content of from 12 to 20% by weight and an average NCO functionality of from 2.5 to 3.
5) Polyisocyanates containing oxadiazinetrione groups, preferably derived from hexamethylene diisocyanate or isophorone diisocyanate. Polyisocyanates of this kind containing oxadiazinetrione groups may be prepared from diisocyanate and carbon dioxide.
6) Uretonimine-modified polyisocyanates.

The polyisocyanates 1) to 6) may be used in a mixture, including if desired in a mixture with diisocyanates.

Suitable components b) include compounds which carry at least one isocyanate-reactive group and at least one free-radically or cationically polymerizable group.

Isocyanate-reactive groups may, for example, be —OH, —SH, —NH$_2$ and —NHR$^4$, R$^4$ being as defined below, but may be different from the radicals used there.

Polymerizable groups may be those containing unsaturated bonds, preferably carbon-carbon double bonds.

Examples of free-radically polymerizable groups are isolated ethylenically unsaturated groups, conjungated unsaturated groups, vinylaromatic groups, vinyl and vinylidene chloride-type groups, N-vinylamides, vinylpyrrolidones, vinyllactams, vinyl esters, (meth)acrylic esters or acrylonitriles.

Examples of cationically polymerizable groups are isobutylene units or vinyl ethers.

Components b) may, for example, be monoesters of α,β-unsaturated carboxylic acids, such as acrylic acid, methacrylic acid (referred to below for short as "(meth)acrylic acid"), crotonic acid, itaconic acid, fumaric acid, maleic acid, acrylamidoglycolic acid, methacrylamidoglycolic acid or vinyl ethers with diols or polyols which preferably have from 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, glycerol, trimethylolethane, trimethylolpropane, trimethylolbutane, pentaerythritol, ditrimethylolpropane, erythritol, sorbitol, poly THF having a molar weight of between 162 and 378, poly-1,3-propanediol having a molar weight of between 134 and 400 or polyethylene glycol having a molar weight of between 238 and 458. Furthermore, it is also possible to use esters or amides of (meth)acrylic acid with amino alcohols, e.g., 2-aminoethanol, 2-(methylamino)ethanol, 3-amino-1-propanol, 1-amino-2-propanol or 2-(2-aminoethoxy)ethanol, 2-mercaptoethanol or polyaminoalkanes, such as ethylenediamine or diethylentriamine, or vinylacetic acid.

Furthermore, unsaturated polyetherols or polyesterols or polyacrylate polyols having an average OH functionality of from 2 to 10 are suitable.

Examples of amides of ethylenically unsaturated carboxylic acids with amino aclohols are hydroxyalkyl(meth)acrylamides such as N-hydroxymethylacrylamide, N-hydroxymethylmethacrylamide, N-hydroxyethylacrylamide, N-hydroyxethylmethacrylamide, 5-hydroxy-3-oxapentyl(meth)acrylamide, N-hydroxyalkylcrotonamides such as N-hydroxymethylcrotonamide or N-hydroxyalkylmaleimides such as N-hydroxyethylmaleimide.

Preference is given to using 2-hydroxyethyl(meth)acrylate, 2- or 3-hydroxypropyl(meth)acrylate, 1,4-butanediol mono(meth)acrylate, neopentyl glycol mono(meth)acrylate, glycerol mono- and di(meth)acrylate, trimethylolpropane mono- and di(meth)acrylate, pentaerythritol mono-, di- and tri(meth)acrylate and also 4-hydroxybutyl vinyl ether, 2-aminoethyl(meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypropyl(meth)acrylamide or 3-hydroxypropyl(meth)acrylamide. Particular preference is given to 2-hydroxyethyl acrylate, 2-hydroxyethyl methacrylate, 2- or 3-hydroxypropyl acrylate, 1,4-butanediol monoacrylate, and 3-(acryloyloxy)-2-hydroxypropyl methacrylate.

Suitable components c) include compounds of the formula

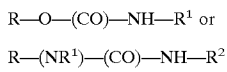

R—O—(CO)—NH—R$^1$ or

R—(NR$^1$)—(CO)—NH—R$^2$ where
R is an aliphatic, cycloaliphatic or aromatic radical of 2 to 20 carbon atoms which must contain at least one isocyanate-reactive group, such as —OH, —NH$_2$, —NHR$^4$ or —SH, and R$^1$, R$^2$ and R$^4$ independently of one another are hydrogen or an alkyl group containing 1 to 4 carbon atoms.

Accordingly, a carbamate end group is in accordance with the invention a carbamic ester which is attached to the radical R via the oxygen atom, and not an unstable carbamic acid attached via the nitrogen atom.

R$^1$, R$^2$ and R$^4$ therein may independently of one another be hydrogen, methyl, ethyl, iso-propyl, n-propyl, n-butyl, iso-butyl, sec-butyl or tert-butyl. Furthermore, R$^1$ and R$^2$ may also together form a ring in which R$^1$ and R$^2$ act as bridges, e.g. 1,2-ethylene, 1,2-propylene, 1,3-propylene or 1,4-butylene.

R therein may have one of the following meanings: hydroxymethyl, 2-hydroxyethyl, 2-hydroxypropyl, 3-hydroxypropyl, 2-hydroxybutyl, 4-hydroxybutyl, 6-hydroxyhexyl, 8-hydroxyoctyl, 10-hydroxydecyl, 12-hydroxydodecyl, 2-hydroxycyclopentyl, 3-hydroxycyclopentyl, 2-hydroxycyclohexyl, 3-hydroxycyclohexyl, 4-hydroxycyclohexyl, 5-hydroxy-3-oxapentyl, 8-hydroxy-3,6-dioxaoctyl, 7-hydroxy-4-oxaheptyl, 3-hydroxy-2-ethylhexyl, 3-hydroxy-2,4-diethyloctyl, 2,2-di(hydroxymethyl)butyl, 2,2-di(hydroxymethyl)propyl, 2,2,2-tri(hydroxymethyl)ethyl, 2-hydroxymethyl-2,2-dimethylethyl, thiomethyl, 2-thioethyl, 2-thiopropyl, 3-thiopropyl, 2-thiobutyl, 4-thiobutyl, 6-thiohexyl, 8-thiooctyl, 10-thiodecyl, 12-thiododecyl, 2-thiocyclopentyl, 3-thiocyclopentyl, 2-thiocyclohexyl, 3-thiocyclohexyl, 4-thiocyclohexyl, 5-thio-3-oxapentyl, 8-thio-3,6-dioxaoctyl, 7-thio-4-oxaheptyl, 3-thio-2-ethylhexyl, 3-thio-2,4-diethyloctyl, aminomethyl, 2-aminoethyl, 2-aminopropyl, 3-aminopropyl, 2-aminobutyl, 4-aminobutyl, 6-aminohexyl, 8-aminooctyl, 10-aminodecyl, 12-aminododecyl, 2-aminocyclopentyl, 3-aminocyclopentyl, 2-aminocyclohexyl, 3-aminocyclohexyl, 4-aminocyclohexyl, 5-amino-3-oxapentyl, 8-amino-3,6-dioxaoctyl, 7-amino-4-oxaheptyl, 3-amino-2-ethylhexyl, 3-amino-2,4-diethyloctyl, 3-amino-3,5,5-trimethylcyclohexyl, (n-methylamino)methyl, 2-(N-methylamino)ethyl, 2-(N-methylamino)propyl, 3-(N-methylamino)propyl, 2-(N-methylamino)butyl, 4-(N-methylamino)butyl, 6-(N-methylamino)hexyl, 8-(N-methylamino)octyl, 10-(N-methylamino)decyl, 12-(N-methylamino)dodecyl, 2-(N-methylamino)cyclopentyl, 3-(N-methylamino)cyclopentyl, 2-(N-methylamino)cyclohexyl, 3-(N-methylamino)cyclohexyl, 4-(N-methylamino)cyclohexyl, 5-(N-methylamino)-3-oxapentyl, 8-(N-methylamino)-3,6-dioxaoctyl, 7-(N-methylamino)-4-oxaheptyl, 3-(N-methylamino)-2-ethylhexyl, 3-(N-methylamino)-2,4-diethyloctyl, (n-methylamino)methyl, 2-(N-ethylamino)ethyl, 2-(N-ethylamino)propyl, 3-(N-ethylamino)propyl, 2-(N-ethylamino)butyl, 4-(N-ethylamino)butyl, 6-(N-ethylamino)hexyl, 8-(N-ethylamino)octyl, 10-(N-ethylamino)decyl, 12-(N-ethylamino)dodecyl, 2-(N-ethylamino)cyclopentyl, 3-(N-ethylamino)cyclopentyl, 2-(N-ethylamino)cyclohexyl, 3-(N-ethylamino)cyclohexyl, 4-(N-ethylamino)cyclohexyl, 5-(N-ethylamino)-3-oxapentyl, 8-(N-ethylamino)-3,6-dioxaoctyl, 7-(N-ethylamino)-4-oxaheptyl, 3-(N-ethylamino)-2-ethylhexyl, 3-(N-ethylamino)-2,4-diethyloctyl, 2-(N-butylamino)ethyl, 2-(N-butylamino)propyl, 3-(N-butylamino)propyl, 2-(N-butylamino)butyl, 4-(N-butylamino)butyl, 6-(N-butylamino)hexyl, 8-(N-butylamino)octyl, 10-(N-butylamino)decyl, 12-(N-butylamino)dodecyl, 2-(N-butylamino)cyclopentyl, 3-(N-butylamino)cyclopentyl, 2-(N-butylamino)cyclopentyl, 3-(N-butylamino)cyclohexyl, 4-(N-butylamino)cyclohexyl, 5-(N-butylamino)-3-oxapentyl, 8-(N-butylamino)-3,6-dioxaoctyl, 7-(N-butylamino)-4-oxaheptyl, 3-(N-butylamino)-2-ethylhexyl or 3-(N-butylamino)-2,4-diethyloctyl.

Examples of compounds c) are the products of ring opening obtainable by reacting cyclic carbonates with ammonia or primary amines, or those aminocarbamates which are obtainable by reacting alkylene oxides with ureas, as known, for example, from U.S. Pat. No. 2,842,523.

Further examples of compounds c) are O-(2-hydroxyethyl)carbamate, O-(2-hydroxypropyl)carbamate, O-(3-hydroxypropyl)carbamate, O-(4-hydroxybutyl)carbamate, O-(6-hydroxyhexyl)carbamate, O-(3-hydroxy-2-ethylhexyl) carbamate, O-(3-hydroxy-2,4-diethyloctyl)carbamate, O-(2,2-di(hydroxymethyl)butyl)carbamate, O-(2,2-di(hydroxymethyl)propyl)carbamate, O-(2,2,2-tri(hydroxymethyl)ethyl)carbamate, O-(2-hydroxymethyl-2,2-dimethylethyl)carbamate, O-(5-hydroxy-3-oxapentyl)carbamate, O-(8-hydroxy-3,6-dioxaoctyl) carbamate, O-(7-hydroxy-4-oxaheptyl)carbamate, O-(2-hydroxyethyl)N-methylcarbamate, O-(2-hydroxypropyl)N-methylcarbamate, O-(3-hydroxypropyl)N-methylcarbamate, O-(4-hydroxybutyl)N-methylcarbamate, O-(6-hydroxyhexyl) N-methylcarbamate, O-(3-hydroxy-2-ethylhexyl)N-methylcarbamate, O-(3-hydroxy-2,4-diethyloctyl)N-methylcarbamate, O-(2,2-di(hydroxymethyl)butyl)N-methylcarbamate, O-(2,2-di(hydroxymethyl)propyl)N-methylcarbamate, O-(2,2,2-tri(hydroxymethyl)ethyl)N-methylcarbamate, O-(2-hydroxymethyl-2,2-dimethylethyl)N-methylcarbamate, O-(5-hydroxy-3-oxapentyl)N-methylcarbamate, O-(8-hydroxy-3,6-dioxaoctyl)N-methylcarbamate, O-(7-hydroxy-4-oxaheptyl)N-methylcarbamate, O-(2-hydroxyethyl) N-ethylcarbamate, O-(2-hydroxypropyl)N-ethylcarbamate, O-(3-hydroxypropyl)N-ethylcarbamate, O-(4-hydroxybutyl) N-ethylcarbamate, O-(6-hydroxyhexyl) N-ethylcarbamate, O-(3-hydroxy-2-ethylhexyl)N-ethylcarbamate, O-(3-hydroxy-2,4-diethyloctyl)N-ethylcarbamate, O-(2,2-di(hydroxymethyl)butyl)N-ethylcarbamate, O-(2,2-di(hydroxymethyl)propyl)N-ethylcarbamate, O-(2,2,2-tri(hydroxymethyl)ethyl)N-ethylcarbamate, O-(2-hydroxymethyl-2,2-dimethylethyl)N-ethylcarbamate, O-(5-hydroxy-3-oxapentyl)N-ethylcarbamate, O-(8-hydroxy-3,6-dioxaoctyl)N-ethylcarbamate, O-(7-hydroxy-4-oxaheptyl)N-ethylcarbamate, O-(2-hydroxyethyl) N-butylcarbamate, O-(2-hydroxypropyl)N-butylcarbamate, O-(3-hydroxypropyl)N-butylcarbamate, O-(4-hydroxybutyl) N-butylcarbamate, O-(6-hydroxyhexyl)N-butylcarbamate, O-(3-hydroxy-2-ethylhexyl)N-butylcarbamate, O-(3-hydroxy-2,4-diethyloctyl)N-butylcarbamate, O-(2,2-di (hydroxymethyl)butyl)N-butylcarbamate, O-(2,2-di(hydroxymethyl)propyl)N-butylcarbamate, O-(2,2,2-tri(hydroxymethyl)ethyl)N-butylcarbamate, O-(2-hydroxymethyl-2,2-dimethylethyl)N-butylcarbamate, O-(5-hydroxy-3-oxapentyl)N-butylcarbamate, O-(8-hydroxy-3,6-dioxaoctyl)N-butylcarbamate, O-(7-hydroxy-4-oxaheptyl)N-butylcarbamate, O-(2-(methylamino)ethyl)carbamate, O-(2-(methylamino)propyl) carbamate, O-(3-(methylamino)propyl)carbamate, O-(4-(methylamino)butyl)carbamate, O-(6-(methylamino)hexyl) carbamate, O-(3-(methylamino)-2-ethylhexyl)carbamate, O-(3-(methylamino)-2,4-diethyloctyl)carbamate, O-(2,2-di((methylamino)methyl)butyl)carbamate, O-(2,2-di((methylamino)methyl)propyl)carbamate, O-(2,2,2-tri((methylamino)methyl)ethyl)carbamate, O-(2-(methylamino)methyl-2,2-dimethylethyl)carbamate, O-(5-methylamino-3-oxapentyl)carbamate, O-(8-methylamino-3,6-dioxaoctyl)carbamate, O-(7-methylamino-4-oxaheptyl)carbamate, O-(2-(methylamino)ethyl) N-methylcarbamate, O-(2-(methylamino)propyl)N-methylcarbamate, O-(3-(methylamino)propyl)N-methylcarbamate, O-(4-(methylamino)butyl)N-methylcarbamate, O-(6-(methylamino)hexyl)N-methylcarbamate, O-(3-methylamino-2-ethylhexyl)N-methylcarbamate, O-(3-methylamino-2,4-diethyloctyl)N-methylcarbamate, O-(2,2-di((methylamino)methyl)butyl)N-methylcarbamate, O-(2,2-di((methylamino)methyl)propyl)N-methylcarbamate, O-(2,2,2-tri((methylamino)methyl)ethyl)N-methylcarbamate, O-(2-(methylamino)methyl-2,2-dimethylethyl)N-methylcarbamate, O-(5-methylamino-3-oxapentyl)N-methylcarbamate, O-(8-methylamino-3,6-dioxaoctyl)N-methylcarbamate, O-(7-methylamino-4-oxaheptyl)N-methylcarbamate, O-(2-(methylamino)ethyl)N-ethylcarbamate, O-(2-(methylamino)propyl)N-ethylcarbamate, O-(3-(methylamino)propyl)N-ethylcarbamate, O-(4-(methylamino)butyl)N-ethylcarbamate, O-(6-(methylamino)hexyl)N-ethylcarbamate, O-(3-methylamino-2-ethylhexyl)N-ethylcarbamate, O-(3-methylamino-2,4-diethyloctyl)N-ethylcarbamate, O-(2,2-di((methylamino)methyl)butyl)N-ethylcarbamate, O-(2,2-di((methylamino)methyl)propyl)N-ethylcarbamate, O-(2,2,2-tri((methylamino)methyl)ethyl)N-ethylcarbamate, O-(2-(methylamino)methyl-2,2-dimethylethyl)N-ethylcarbamate, O-(5-methylamino-3-oxapentyl)N-ethylcarbamate, O-(8-methylamino-3,6-dioxaoctyl)N-ethylcarbamate, O-(7-methylamino-4-oxaheptyl)N-ethylcarbamate, O-(2-(methylamino)ethyl)N-butylcarbamate, O-(2-(methylamino)propyl)N-butylcarbamate, O-(3-(methylamino)propyl)N-butylcarbamate, O-(4-(methylamino)butyl)N-butylcarbamate, O-(6-(methylamino-2)hexyl)N-butylcarbamate, O-(3-methylamino-2-ethylhexyl)N-butylcarbamate, O-(3-methylamino-2,4-diethyloctyl)N-butylcarbamate, O-(2,2-di((methylamino)methyl)butyl)N-butylcarbamate, O-(2,2-di((methylamino)methyl)propyl)N-butylcarbamate, O-(2,2,2-tri((methylamino)methyl)ethyl)N-butylcarbamate, O-(2-(methylamino)methyl-2,2-dimethylethyl)N-butylcarbamate, O-(5-methylamino-3-oxapentyl)N-butylcarbamate, O-(8-methylamino-3,6-dioxaoctyl)N-butylcarbamate, O-(7-methylamino-4-oxaheptyl)N-butylcarbamate, O-(2-(ethylamino)ethyl)carbamate, O-(2-(ethylamino)propyl) carbamate, O-(3-(ethylamino)propyl)carbamate, O-(4-(ethylamino)butyl)carbamate, O-(6-(ethylamino)hexyl) carbamate, O-(3-ethylamino-2-ethylhexyl)carbamate, O-(3-ethylamino-2,4-diethyloctyl)carbamate, O-(2,2-di((ethylamino)methyl)butyl)carbamate, O-(2,2-di((ethylamino)methyl)propyl) carbamate, O-(2,2,2-tri((ethylamino)methyl)ethyl) carbamate, O-(2-(ethylamino)methyl-2,2-dimethylethyl) carbamate, O-(5-ethylamino-3-oxapentyl)carbamate, O-(8-ethylamino-3,6-dioxaoctyl)carbamate, O-(7-ethylamino-4-oxaheptyl)carbamate, O-(2-(ethylamino)ethyl) N-methylcarbamate, O-(2-(ethylamino)propyl)N-methylcarbamate, O-(3-(ethylamino)propyl)N-methylcarbamate, O-(4-(ethylamino)butyl)N-methylcarbamate, O-(6-(ethylamino)hexyl)N-methylcarbamate, O-(3-ethylamino-2-ethylhexyl)N-methylcarbamate, O-(3-ethylamino-2,4-diethyloctyl)N-methylcarbamate, O-(2,2-di((ethylamino)methyl)butyl)N-methylcarbamate, O-(2,2-di((ethylamino)methyl)propyl)N-methylcarbamate, O-(2,2,2-tri((ethylamino)methyl)ethyl)N-methylcarbamate, O-(2-(ethylamino)methyl-2,2-dimethylethyl)N-methylcarbamate, O-(5-ethylamino-3-oxapentyl)N-methylcarbamate, O-(8-ethylamino-3,6-dioxaoctyl)N-methylcarbamate, O-(7-ethylamino-4-oxaheptyl)N-methylcarbamate, O-(2-(ethylamino)ethyl)N-ethylcarbamate, O-(2-(ethylamino)propyl)N-ethylcarbamate, O-(3-(ethylamino)propyl)N-ethylcarbamate, O-(4-(ethylamino)butyl)N-ethylcarbamate, O-(6-(ethylamino)hexyl) N-ethylcarbamate, O-(3-ethylamino-2-ethylhexyl)N-ethylcarbamate, O-(2,2-di((ethylamino)methyl)butyl)N-ethylcarbamate, O-(2,2-di((ethylamino)methyl)propyl)N-ethylcarbamate, O-(2,2,2-tri((ethylamino)methyl)ethyl)N-ethylcarbamate, O-(2-(ethylamino)methyl-2,2-dimethylethyl)N-ethylcarbamate, O-(5-ethylamino-3-oxapentyl)N-ethylcarbamate, O-(8-ethylamino-3,6-dioxaoctyl)N-ethylcarbamate, O-(7-ethylamino-4-oxaheptyl)N-ethylcarbamate, O-(2-(ethylamino)ethyl)N-butylcarbamate, O-(2-(ethylamino)propyl)N-butylcarbamate, O-(3-(ethylamino)propyl)N-butylcarbamate, O-(4-(ethylamino)butyl)N-butylcarbamate, O-(6-(ethylamino)hexyl) N-butylcarbamate, O-(3-ethylamino-2-ethylhexyl)N-butylcarbamate, O-(3-ethylamino-2,4-diethyloctyl)N-butylcarbamate, O-(2,2-di((ethylamino)methyl)butyl)N-butylcarbamate, O-(2,2-di((ethylamino)methyl)propyl)N-butylcarbamate, O-(2,2,2-tri((ethylamino)methyl)ethyl)N-butylcarbamate, O-(2-(ethylamino)methyl-2,2-dimethylethyl)N-butylcarbamate, O-(5-ethylamino-3-oxapentyl)N-butylcarbamate, O-(8-ethylamino-3,6-dioxaoctyl)N-butylcarbamate, O-(7-ethylamino-4-oxaheptyl)N-butylcarbamate, O-(2-(butylamino)ethyl)carbamate, O-(2-(butylamino)propyl) carbamate, O-(3-(butylamino)propyl)carbamate, O-(4-(butylamino)butyl)carbamate, O-(6-(butylamino)hexyl) carbamate, O-(3-butylamino-2-ethylhexyl)carbamate, O-(3-butylamino-2,4-diethyloctyl)carbamate, O-(2,2-di((butylamino)methyl)butyl)carbamate, O-(2,2-di((butylamino)methyl)propyl)carbamate, O-(2,2,2-tri((butylamino)methyl)ethyl)carbamate, O-(2-(butylamino)methyl-2,2-dimethylethyl)carbamate, O-(5-butylamino-3-oxapentyl)carbamate, O-(8-butylamino-3,6-dioxaoctyl) carbamate, O-(7-butylamino-4-oxaheptyl)carbamate, O-(2-(butylamino)ethyl) N-methylcarbamate, O-(2-(butylamino)propyl)N-methylcarbamate, O-(3-(butylamino)propyl)N-methylcarbamate, O-(4-(butylamino)butyl)N-methylcarbamate, O-(6-(butylamino)hexyl)N-methylcarbamate, O-(3-butylamino-2-ethylhexyl)N-methylcarbamate, O-(3-butylamino-2,4-diethyloctyl)N-methylcarbamate, O-(2,2-di((butylamino)methyl)butyl)N-methylcarbamate, O-(2,2-di((butylamino)methyl)propyl)N-methylcarbamate, O-(2,2,2-tri((butylamino)methyl)ethyl)N-methylcarbamate, O-(2-(butylamino)methyl-2,2-dimethylethyl)N-methylcarbamate, O-(5-butylamino-3-oxapentyl)N-methylcarbamate, O-(8-butylamino-3,6- dioxaoctyl)N-methylcarbamate, O-(7-butylamino-4-oxaheptyl)N-methylcarbamate, O-(2-(butylamino)ethyl)N-ethylcarbamate, O-(2-(butylamino)propyl)N-ethylcarbamate, O-(3-(butylamino)propyl)N-ethylcarbamate, O-(4-(butylamino)butyl)N-ethylcarbamate, O-(6-(butylamino)hexyl) N-ethylcarbamate, O-(3-butylamino-2-ethylhexyl)N-ethylcarbamate, O-(3-butylamino-2,4-diethyloctyl)N-ethylcarbamate, O-(2,2-di((butylamino)methyl)butyl)N-ethylcarbamate, O-(2,2-di((butylamino)methyl)propyl)N-ethylcarbamate, O-(2,2,2-tri((butylamino)methyl)ethyl)N-ethylcarbamate, O-(2-(butylamino)methyl-2,2-dimethylethyl)N-ethylcarbamate, O-(5-butylamino-3-oxapentyl)N-ethylcarbamate, O-(8-butylamino-3,6-dioxaoctyl)N-ethylcarbamate, O-(7-butylamino-4-oxaheptyl)N-ethylcarbamate, O-(2-(butylamino)ethyl)N-butylcarbamate, O-(2-(butylamino)propyl)N-butylcarbamate, O-(3-(butylamino)propyl)N-butylcarbamate, O-(4-(butylamino)butyl)N-butylcarbamate, O-(6-(butylamino)hexyl) N-butylcarbamate, O-(3-butylamino-2-ethylhexyl)N-butylcarbamate, O-(3-butylamino-2,4-diethyloctyl)N-butylcarbamate, O-(2,2-di((butylamino)methyl)butyl)N-butylcarbamate, O-(2,2-di((butylamino)methyl)propyl)N-butylcarbamate, O-(2,2,2-tri((butylamino)methyl)ethyl)N-butylcarbamate, O-(2-(butylamino)methyl-2,2-dimethylethyl)N-butylcarbamate, O-(5-butylamino-3-oxapentyl)N-butylcarbamate, O-(8-butylamino-3,6-dioxaoctyl)N-butylcarbamate, O-(7-butylamino-4-oxaheptyl)N-butylcarbamate, O-(2-thioethyl)carbamate, O-(2-thiopropyl)carbamate, O-(3-thiopropyl)carbamate, O-(4-thiobutyl)carbamate, O-(6-thiohexyl) carbamate, O-(2-thioethyl)N-methylcarbamate, O-(2-thiopropyl) N-methylcarbamate, O-(3-thiopropyl)N-methylcarbamate, O-(4-thiobutyl)N-methylcarbamate, O-(6-thiohexyl) N-methylcarbamate, O-(2-thioethyl)N-ethylcarbamate, O-(2-thiopropyl)N-ethylcarbamate, O-(3-thiopropyl) N-ethylcarbamate, O-(4-thiobutyl)N-ethylcarbamate, O-(6-thiohexyl)N-ethylcarbamate, O-(2-thioethyl) N-butylcarbamate, O-(2-thiopropyl)N-butylcarbamate, O-(3-thiopropyl)N-butylcarbamate, O-(4-thiobutyl) N-butylcarbamate, O-(6-thiohexyl)N-butylcarbamate, N-(2-hydroxyethyl)urea, N-(2-hydroxypropyl)urea, N-(3-hydroxypropyl)urea, N-(4-hydroxybutyl)urea, N-(6-hydroxyhexyl)urea, N-(3-hydroxy-2-ethylhexyl)urea, N-(3-hydroxy-2,4-diethyloctyl)urea, N-(2,2-di(hydroxymethyl)butyl)urea, N-(2,2-di(hydroxymethyl)propyl)urea, N-(2,2,2-tri(hydroxymethyl)ethyl)urea, N-(2-hydroxymethyl-2,2-dimethylethyl)urea, N-(5-hydroxy-3-oxapentyl)urea, N-(8-hydroxy-3,6-dioxaoctyl)urea, N-(7-hydroxy-4-oxaheptyl)urea, N-(3-amino-3,5,5-trimethylcyclohexyl)-urea, N-(3-hydroxy-3,5,5-trimethylcyclohexyl)urea, N-(2-hydroxyethyl) N'-methylurea, N-(2-hydroxypropyl)-N'-methylurea, N-(3-hydroxypropyl)-N'-methylurea, N-(4-hydroxybutyl)-N'-methylurea, N-(6-hydroxyhexyl)-N'-methylurea, N-(3-hydroxy-2-ethylhexyl)-N'-methylurea, N-(3-hydroxy-2,4-diethyl-octyl)-N'-methylurea, N-(2,2-di(hydroxymethyl)butyl)-N'-methylurea, N-(2,2-di(hydroxymethyl)propyl)-N'-methylurea, N-(2,2,2-tri(hydroxymethyl)ethyl)-N'-methylurea, N-(2-hydroxymethyl-2,2-dimethylethyl)-N'-methylurea, N-(5-hydroxy-3-oxapentyl)-N'-methylurea, N-(8-hydroxy-3,6-dioxaoctyl)-N'-methylurea, N-(7-hydroxy-4-oxaheptyl)-N'-methylurea, N-(3-amino-3,5,5-trimethylcyclohexyl)-N'-methylurea, N-(3-hydroxy-3,5,5-trimethylcyclohexyl)-N'-methylurea, N-(2-hydroxyethyl)-N'-ethylurea, N-(2-hydroxypropyl)-N'-ethylurea, N-(3-hydroxypropyl)-N'-ethylurea, N-(4-hydroxybutyl)-N'-ethylurea, N-(6-hydroxyhexyl)-N'-ethylurea, N-(3-hydroxy-2-ethylhexyl)-N'-ethylurea, N-(3-hydroxy-2,4-diethyloctyl)-N'-ethylurea, N-(2,2-di(hydroxymethyl)butyl)-N'-ethylurea, N-(2,2-di(hydroxymethyl)propyl)-N'-ethylurea, N-(2,2,2-tri(hydroxymethyl)ethyl)-N'-ethylurea, N-(2-hydroxymethyl-2,2-dimethylethyl)-N'-ethylurea, N-(5-hydroxy-3-oxapentyl)-N'-ethylurea, N-(8-hydroxy-3,6-dioxaoctyl)-N'-ethylurea, N-(7-hydroxy-4-oxaheptyl)-N'-ethylurea, N-(3-amino-3,5,5-trimethylcyclohexyl)-N'-ethylurea, N-(3-hydroxy-3,5,5-trimethylcyclohexyl)-N'-ethylurea, N-(2-hydroxyethyl)-N'-butylurea, N-(2-hydroxypropyl)-N'-butylurea, N-(3-hydroxypropyl)-N'-butylurea, N-(4-hydroxybutyl)-N'-butylurea, N-(6-hydroxyhexyl)-N'-butylurea, N-(3-hydroxy-2-ethyl-hexyl)-N'-butylurea, N-(3-hydroxy-2,4-diethyloctyl)-N'-butylurea, N-(2,2-di(hydroxymethyl)butyl)-N'-butylurea, N-(2,2-di(hydroxymethyl)propyl)-N'-butylurea, N-(2,2,2-tri(hydroxymethyl)ethyl)-N'-butylurea, N-(2-hydroxymethyl-2,2-dimethylethyl)-N'-butylurea, N-(5-hydroxy-3-oxapentyl)-N'-butylurea, N-(8-hydroxy-3,6-dioxaoctyl)-N'-butylurea, N-(7-hydroxy-4-oxaheptyl)-N'-butylurea, N-(3-amino-3,5,5-trimethylcyclohexyl)-N'-butylurea, N-(3-hydroxy-3,5,5-trimethylcyclohexyl)-N'-butylurea, N-(2-(methylamino)ethyl)urea, N-(2-(methylamino)propyl)urea, N-(3-(methylamino)propyl)urea, N-(4-(methylamino)butyl)urea, N-(6-(methylamino)hexyl)urea, N-(3-methylamino-2-ethylhexyl)urea, N-(3-methylamino-2,4-diethyloctyl)urea, N-(2,2-di((methylamino)methyl)butyl)urea, N-(2,2-di((methylamino)methyl)propyl)urea, N-(2,2,2-tri((methylamino)methyl)ethyl)urea, N-(2-(methylamino)methyl-2,2-dimethylethyl)urea, N-(5-methylamino-3-oxapentyl)urea, N-(8-methylamino-3,6-dioxaoctyl)urea, N-(7-methylamino-4-oxaheptyl)urea, N-(2-(methylamino)ethyl)-N'-methylurea, N-(2-(methylamino)propyl)-N'-methylurea, N-(3-(methylamino)propyl)-N'-methylurea, N-(4-(methylamino)butyl)-N'-methylurea, N-(6-(methylamino)hexyl)-N'-methylurea, N-(3-methylamino-2-ethylhexyl)-N'-methylurea, N-(3-methylamino-2,4-diethyloctyl)-N'-methylurea, N-(2,2-di((methylamino)methyl)butyl)-N'-methylurea, N-(2,2-di((methylamino)methyl)propyl)-N'-methylurea, N-(2,2,2-tri((methylamino)methyl)ethyl)-N'-methylurea, N-(2-(methylamino)methyl-2,2-dimethylethyl)-N'-methylurea, N-(5-methylamino-3-oxapentyl)-N'-methylurea, N-(8-methylamino-3,6-dioxaoctyl)-N'-methylurea, N-(7-methylamino-4-oxaheptyl)-N'-methylurea, N-(2-(methylamino)ethyl)-N'-ethylurea, N-(2-(methylamino)propyl)-N'-ethylurea, N-(3-(methylamino)propyl)-N'-ethylurea, N-(4-(methylamino)butyl)-N'-ethylurea, N-(6-(methylamino)hexyl)-N'-ethylurea, N-(3-methylamino-2-ethylhexyl)-N'-ethylurea, N-(3-methylamino-2,4-diethyloctyl)-N'-ethylurea, N-(2,2-di((methylamino)methyl)butyl)-N'-ethylurea, N-(2,2-di((methylamino)methyl)propyl)-N'-ethylurea, N-(2,2,2-tri((methylamino)methyl)ethyl)-N'-ethylurea, N-(2-(methylamino)methyl-2,2-dimethylethyl)-N'-ethylurea, N-(5-methylamino-3-oxapentyl)-N'-ethylurea, N-(8-methylamino-3,6-dioxaoctyl)-N'-ethylurea, N-(7-methylamino-4-oxaheptyl)-N'-ethylurea, N-(2-(methylamino)ethyl)-N'-butylurea, N-(2-(methylamino)propyl)-N'-butylurea, N-(3-(methylamino)propyl)-N'-butylurea, N-(4-(methylamino)butyl)-N'-butylurea, N-(6-(methylamino)hexyl)-N'-butylurea, N-(3-methylamino-2-ethylhexyl)-N'-butylurea, N-(3-methylamino-2,4-diethyloctyl)-N'-butylurea, N-(2,2-di((methylamino)methyl)butyl)-N'-butylurea, N-(2,2-di((methylamino)methyl)propyl)-N'-butylurea, N-(2,2,2-tri((methylamino)methyl)ethyl)-N'-butylurea, N-(2-(methylamino)methyl-2,2-dimethylethyl)-N'-butylurea, N-(5-methylamino-3- oxapentyl)-N'-butylurea, N-(8-methylamino-3,6-dioxaoctyl)-N'-butylurea, N-(7-methylamino-4-oxaheptyl)-N'-butylurea, N-(2-(ethylamino)ethyl)urea, N-(2-(ethylamino)propyl)urea, N-(3-(ethylamino)propyl)urea, N-(4-(ethylamino)butyl)urea, N-(6-(ethylamino)hexyl)urea, N-(3-ethylamino-2-ethylhexyl)urea, N-(3-ethylamino-2,4-diethyloctyl)urea, N-(2,2-di((ethylamino)methyl)butyl)urea, N-(2,2-di((ethylamino)methyl)propyl)urea, N-(2,2,2-tri((ethylamino)methyl)ethyl)urea, N-(2-(ethylamino)methyl-2,2-dimethylethyl)urea, N-(5-ethylamino-3-oxapentyl)urea, N-(8-ethylamino-3,6-dioxaoctyl)urea, N-(7-ethylamino-4-oxaheptyl)urea, N-(2-(ethylamino)ethyl)-N'-methylurea, N-(2-(ethylamino)propyl)-N'-methylurea, N-(3-(ethylamino)propyl)-N'-methylurea, N-(4-(ethylamino)butyl)-N'-methylurea, N-(6-(ethylamino)hexyl)-N'-methylurea, N-(3-ethylamino-2-ethylhexyl)-N'-methylurea, N-(3-ethylamino-2,4-diethyloctyl)-N'-methylurea, N-(2,2-di((ethylamino)methyl)butyl)-N'-methylurea, N-(2,2-di((ethylamino)methyl)propyl)-N'-methylurea, N-(2,2,2-tri((ethylamino)methyl)ethyl)-N'-methylurea, N-(2-(ethylamino)methyl-2,2-dimethylethyl)-N'-methylurea, N-(5-ethylamino-3-oxapentyl)-N'-methylurea, N-(8-ethylamino-3,6-dioxaoctyl)-N'-methylurea, N-(7-ethylamino-4-oxaheptyl)-N'-methylurea, N-(2-(ethylamino)ethyl)-N'-ethylurea, N-(2-(ethylamino)propyl)-N'-ethylurea, N-(3-(ethylamino)propyl)-N'-ethylurea, N-(4-(ethylamino)butyl)-N'-ethylurea, N-(6-(ethylamino)hexyl)-N'-ethylurea, N-(3-ethylamino-2-ethylhexyl)-N'-ethylurea, N-(3-ethylamino-2,4-diethyloctyl)-N'-ethylurea, N-(2,2-di((ethylamino)methyl)butyl)-N'-ethylurea, N-(2,2-di((ethylamino)methyl)propyl)-N'-ethylurea, N-(2,2,2-tri((ethylamino)methyl)ethyl)-N'-ethylurea, N-(2-(ethylamino)methyl-2,2-dimethylethyl)-N'-ethylurea, N-(5-ethylamino-3-oxapentyl)-N'-ethylurea, N-(8-ethylamino-3,6-dioxaoctyl)-N'-ethylurea, N-(7-ethylamino-4-oxaheptyl)-N'-ethylurea, N-(2-(ethylamino)ethyl)-N'-butylurea, N-(2-(ethylamino)propyl)-N'-butylurea, N-(3-(ethylamino)-N'-butylurea, N-(4-(ethylamino)butyl)-N'-butylurea, N-(6-(ethylamino)hexyl)-N'-butylurea, N-(3-ethylamino-2-ethylhexyl)-N'-butylurea, N-(3-ethylamino-2,4-diethyloctyl)-N'-butylurea, N-(2,2-di((ethylamino)methyl)butyl)-N'-butylurea, N-(2,2-di((ethylamino)methyl)propyl)-N'-butylurea, N-(2,2,2-tri((ethylamino)methyl)ethyl)-N'-butylurea, N-(2-(ethylamino)methyl-2,2-dimethylethyl)-N'-butylurea, N-(5-ethylamino-3-oxapentyl)-N'-butylurea, N-(8-ethylamino-3,6-dioxaoctyl)-N'-butylurea, N-(7-ethylamino-4-oxaheptyl)-N'-butylurea, N-(2-(butylamino)ethyl)urea, N-(2-(butylamino)propyl)urea, N-(3-(butylamino)propyl)urea, N-(4-(butylamino)butyl)urea, N-(6-(butylamino)hexyl)urea, N-(3-butylamino-2-ethylhexyl)urea, N-(3-butylamino-2,4-diethyloctyl)urea, N-(2,2-di((butylamino)methyl)butyl)urea, N-(2,2-di((butylamino)methyl)propyl)urea, N-(2,2,2-tri((butylamino)methyl)ethyl)urea, N-(2-(butylamino)methyl-2,2-dimethylethyl)urea, N-(5-butylamino-3-oxapentyl)urea, N-(8-butylamino-3,6-dioxaoctyl)urea, N-(7-butylamino-4-oxaheptyl)urea, N-(2-(butylamino)ethyl)-N'-methylurea, N-(2-(butylamino)propyl)-N'-methylurea, N-(3-(butylamino)propyl)-N'-methylurea, N-(4-(butylamino)butyl)-N'-methylurea, N-(6-(butylamino)hexyl)-N'-methylurea, N-(3-butylamino-2-ethylhexyl)-N'-methylurea, N-(3-butylamino-2,4-diethyloctyl)-N'-methylurea, N-(2,2-di((butylamino)methyl)butyl)-N'-methylurea, N-(2,2-di((butylamino)methyl)propyl)-N'-methylurea, N-(2,2,2-tri((butylamino)methyl)ethyl)-N'-methylurea, N-(2-(butylamino)methyl-2,2-dimethylethyl)-N'-methylurea, N-(5-butylamino-3-oxapentyl)-N'-methylurea, N-(8-butylamino-3,6-dioxaoctyl)-N'-methylurea, N-(7-butylamino-4-oxaheptyl)-N'-methylurea, N-(2-(butylamino)ethyl)-N'-ethylurea, N-(2-(butylamino)propyl)-N'-ethylurea, N-(3-(butylamino)propyl)-N'-ethylurea, N-(4-(butylamino)butyl)-N'-ethylurea, N-(6-(butylamino)hexyl)-N'-ethylurea, N-(3-butylamino-2-ethylhexyl)-N'-ethylurea, N-(3-butylamino-2,4-diethyloctyl)-N'-ethylurea, N-(2,2-di((butylamino)methyl)butyl)-N'-ethylurea, N-(2,2-di((butylamino)methyl)propyl)-N'-ethylurea, N-(2,2,2-tri((butylamino)methyl)ethyl)-N'-ethylurea, N-(2-(butylamino)methyl-2,2-dimethylethyl)-N'-ethylurea, N-(5-butylamino-3-oxapentyl)-N'-ethylurea, N-(8-butylamino-3,6-dioxaoctyl)-N'-ethylurea, N-(7-butylamino-4-oxaheptyl)-N'-ethylurea, N-(2-(butylamino)ethyl)-N'-butylurea, N-(2-(butylamino)propyl)-N'-butylurea, N-(3-(butylamino)propyl)-N'-butylurea, N-(4-(butylamino)butyl)-N'-butylurea, N-(6-(butylamino)hexyl)-N'-butylurea, N-(3-butylamino-2-ethylhexyl)-N'-butylurea, N-(3-butylamino-2,4-diethyloctyl)-N'-butylurea, N-(2,2-di((butylamino)methyl)butyl)-N'-butylurea, N-(2,2-di((butylamino)methyl)propyl)-N'-butylurea, N-(2,2,2-tri((butylamino)methyl)ethyl)-N'-butylurea, N-(2-(butylamino)methyl-2,2-dimethylethyl)-N'-butylurea, N-(5-butylamino-3-oxapentyl)-N'-butylurea, N-(8-butylamino-3,6-dioxaoctyl)-N'-butylurea, N-(7-butylamino-4-oxaheptyl)-N'-butylurea, N-(2-thioethyl)urea, N-(2-thiopropyl)urea, N-(3-thiopropyl)urea, N-(4-thiobutyl)urea, N-(6-thiohexyl)urea, N-(2-thioethyl)-N'-methylurea, N-(2-thiopropyl)-N'-methylurea, N-(3-thiopropyl)-N'-methylurea, N-(4-thiobutyl)-N'-methylurea, N-(6-thiohexyl)-N'-methylurea, N-(2-thioethyl)-N'-ethylurea, N-(2-thiopropyl)-N'-ethylurea, N-(3-thiopropyl)-N'-ethylurea, N-(4-thiobutyl)-N'-ethylurea, N-(6-thiohexyl)-N'-ethylurea, N-(2-thioethyl)-N'-butylurea, N-(2-thiopropyl)-N'-butylurea, N-(3-thiopropyl)-N'-butylurea, N-(4-thiobutyl)-N'-butylurea, N-(6-thiohexyl)-N'-butylurea, N-(2-hydroxyethyl)-N,N'-ethyleneurea, N-(2-hydroxypropyl)-N,N'-ethyleneurea, N-(3-hydroxypropyl)-N,N'-ethyleneurea, N-(4-hydroxybutyl)-N,N'-ethyleneurea, N-(6-hydroxyhexyl)-N,N'-ethyleneurea, N-(3-hydroxy-2-ethylhexyl)-N,N'-ethyleneurea, N-(3-hydroxy-2,4-diethyloctyl)-N,N'-ethyleneurea, N-(2,2-di(hydroxymethyl)butyl)-N,N'-ethyleneurea, N-(2,2-di(hydroxymethyl)propyl)-N,N'-ethyleneurea, N-(2,2,2-tri(hydroxymethyl)ethyl)-N,N'-ethyleneurea, N-(2-hydroxymethyl-2,2-dimethylethyl)-N,N'-ethyleneurea, N-(5-hydroxy-3-oxapentyl)-N,N'-ethyleneurea, N-(8-hydroxy-3,6-dioxaoctyl)-N,N'-ethyleneurea, N-(7-hydroxy-4-oxaheptyl)-N,N'-ethyleneurea, N-(2-(methylamino)ethyl)-N,N'-ethyleneurea, N-(2-(methylamino)propyl)-N,N'-ethyleneurea, N-(3-(methylamino)propyl)-N,N'-ethyleneurea, N-(4-(methylamino)butyl)-N,N'-ethyleneurea, N-(6-(methylamino)hexyl)-N,N'-ethyleneurea, N-(3-methylamino-2-ethylhexyl)-N,N'-ethyleneurea, N-(3-methylamino-2,4-diethyloctyl)-N,N'-ethyleneurea, N-(2,2-di((methylamino)methyl)butyl)-N,N'-ethyleneurea, N-(2,2-di((methylamino)methyl)propyl)-N,N'-ethyleneurea, N-(2,2,2-tri((methylamino)methyl)ethyl)-N,N'-ethyleneurea, N-(2-(methylamino)methyl-2,2-dimethylethyl)-N,N'-ethyleneurea, N-(5-methylamino-3-oxapentyl)-N,N'-ethyleneurea, N-(8-methylamino-3,6-dioxaoctyl)-N,N'-ethyleneurea, N-(7-methylamino-4-oxaheptyl)-N,N'-ethyleneurea, N-(3-amino-3,5,5-trimethylcyclohexyl)-N,N'-ethyleneurea, N-(3-hydroxy-3,5,5-trimethylcyclohexyl)-N,N'-ethyleneurea, N-(2-(ethylamino)ethyl)-N,N'-ethyleneurea, N-(2-(ethylamino)propyl)-N,N'-ethyleneurea, N-(3-(ethylamino)propyl)-N,N'-ethyleneurea, N-(4-

(ethylamino)butyl)-N,N'-ethyleneurea, N-(6-(ethylamino) hexyl)-N,N'-ethyleneurea, N-(3-ethylamino-2-ethylhexyl)-N,N'-ethyleneurea, N-(3-ethylamino-2,4-diethyloctyl)-N,N'-ethyleneurea, N-(2,2-di((ethylamino)methyl)butyl)-N,N'-ethyleneurea, N-(2,2-di((ethylamino)methyl)propyl)-N,N'-ethyleneurea, N-(2,2,2-tri((ethylamino)methyl)ethyl)-N,N'-ethyleneurea, N-(2-(ethylamino)methyl-2,2-dimethylethyl)-N,N'-ethyleneurea, N-(5-ethylamino-3-oxapentyl)-N,N'-ethyleneurea, N-(8-ethylamino-3,6-dioxaoctyl)-N,N'-ethyleneurea, N-(7-ethylamino-4-oxaheptyl)-N,N'-ethyleneurea, N-(2-(butylamino)ethyl)-N,N'-ethyleneurea, N-(2-(butylamino)propyl)-N,N'-ethyleneurea, N-(3-(butylamino)propyl)-N,N'-ethyleneurea, N-(4-(butylamino)butyl)-N,N'-ethyleneurea, N-(6-(butylamino)hexyl)-N,N'-ethyleneurea, N-(3-butylamino-2-ethylhexyl)-N,N'-ethyleneurea, N-(3-butylamino-2,4-diethyloctyl)-N,N'-ethyleneurea, N-(2,2-di((butylamino)methyl)butyl)-N,N'-ethyleneurea, N-(2,2-di((butylamino)methyl)propyl)-N,N'-ethyleneurea, N-(2,2,2-tri((butylamino)methyl)ethyl)-N,N'-ethyleneurea, N-(2-(butylamino)methyl-2,2-dimethylethyl)-N,N'-ethyleneurea, N-(5-butylamino-3-oxapentyl)-N,N'-ethyleneurea, N-(8-butylamino-3,6-dioxaoctyl)-N,N'-ethyleneurea, N-(7-butylamino-4-oxaheptyl)-N,N'-ethyleneurea, N-(2-thioethyl)-N,N'-ethyleneurea, N-(2-thiopropyl)-N,N'-ethyleneurea, N-(3-thiopropyl)-N,N'-ethyleneurea, N-(4-thiobutyl)-N,N'-ethyleneurea, N-(6-thiohexyl)-N,N'-ethyleneurea, N-(2-hydroxyethyl)-N,N'-propyleneurea, N-(2-hydroxypropyl)-N,N'-propyleneurea, N-(3-hydroxypropyl)-N,N'-propyleneurea, N-(4-hydroxybutyl)-N,N'-propyleneurea, N-(6-hydroxyhexyl)-N,N'-propyleneurea, N-(3-hydroxy-2-ethylhexyl)-N,N'-propyleneurea, N-(3-hydroxy-2,4-diethyloctyl)-N,N'-propyleneurea, N-(2,2-di(hydroxymethyl)butyl)-N,N'-propyleneurea, N-(2,2-di(hydroxymethyl)propyl)-N,N'-propyleneurea, N-(2,2,2-tri(hydroxymethyl)ethyl)-N,N'-propyleneurea, N-(2-hydroxymethyl-2,2-dimethylethyl)-N,N'-propyleneurea, N-(5-hydroxy-3-oxapentyl)-N,N'-propyleneurea, N-(8-hydroxy-3,6-dioxaoctyl)-N,N'-propyleneurea, N-(7-hydroxy-4-oxaheptyl)-N,N'-propyleneurea, N-(3-amino-3,5,5-trimethylcyclohexyl)-N,N'-propyleneurea, N-(3-hydroxy-3,5,5-trimethylcyclohexyl)-N,N'-propyleneurea, N-(2-(methylamino)ethyl)-N,N'-propyleneurea, N-(2-(methylamino)propyl)-N,N'-propyleneurea, N-(3-(methylamino)propyl)-N,N'-propyleneurea, N-(4-(methylamino)butyl)-N,N'-propyleneurea, N-(6-(methylamino)hexyl)-N,N'-propyleneurea, N-(3-methylamino-2-ethylhexyl)-N,N'-propyleneurea, N-(3-methylamino-2,4-diethyloctyl)-N,N'-propyleneurea, N-(2,2-di((methylamino)methyl)butyl)-N,N'-propyleneurea, N-(2,2-di((methylamino)methyl)propyl)-N,N'-propyleneurea, N-(2,2,2-tri((methylamino)methyl)ethyl)-N,N'-propyleneurea, N-(2-(methylamino)methyl-2,2-dimethylethyl)-N,N'-propyleneurea, N-(5-methylamino-3-oxapentyl)-N,N'-propyleneurea, N-(8-methylamino-3,6-dioxaoctyl)-N,N'-propyleneurea, N-(7-methylamino-4-oxaheptyl)-N,N'-propyleneurea, N-(2-(ethylamino)ethyl)-N,N'-propyleneurea, N-(2-(ethylamino)propyl)-N,N'-propyleneurea, N-(3-(ethylamino)propyl)-N,N'-propyleneurea, N-(4-(ethylamino)butyl)-N,N'-propyleneurea, N-(6-(ethylamino)hexyl)-N,N'-propyleneurea, N-(3-ethylamino-2-ethylhexyl)-N,N'-propyleneurea, N-(3-ethylamino-2,4-diethyloctyl)-N,N'-propyleneurea, N-(2,2-di((ethylamino)methyl)butyl)-N,N'-propyleneurea, N-(2,2-di((ethylamino)methyl)propyl)-N,N'-propyleneurea, N-(2,2,2-tri((ethylamino)methyl)ethyl)-N,N'-propyleneurea, N-(2-(ethylamino)methyl-2,2-dimethylethyl)-N,N'-propyleneurea, N-(5-ethylamino-3-oxapentyl)-N,N'-propyleneurea, N-(8-ethylamino-3,6-dioxaoctyl)-N,N'-propyleneurea, N-(7-ethylamino-4-oxaheptyl)-N,N'-propyleneurea, N-(2-(butylamino)ethyl)-N,N'-propyleneurea, N-(2-(butylamino)propyl)-N,N'-propyleneurea, N-(3-(butylamino)propyl)-N,N'-propyleneurea, N-(4-(butylamino)butyl)-N,N'-propyleneurea, N-(6-(butylamino)hexyl)-N,N'-propyleneurea, N-(3-butylamino-2-ethylhexyl)-N,N'-propyleneurea, N-(3-butylamino-2,4-diethyloctyl)-N,N'-propyleneurea, N-(2,2-di((butylamino)methyl)butyl)-N,N'-propyleneurea, N-(2,2-di((butylamino)methyl)propyl)-N,N'-propyleneurea, N-(2,2,2-tri((butylamino)methyl)ethyl)-N,N'-propyleneurea, N-(2-(butylamino)methyl-2,2-dimethylethyl)-N,N'-propyleneurea, N-(5-butylamino-3-oxapentyl)-N,N'-propyleneurea, N-(8-butylamino-3,6-dioxaoctyl)-N,N'-propyleneurea, N-(7-butylamino-4-oxaheptyl)-N,N'-propyleneurea, N-(2-thioethyl)-N,N'-propyleneurea, N-(2-thiopropyl)-N,N'-propyleneurea, N-(3-thiopropyl)-N,N'-propyleneurea, N-(4-thiobutyl)-N,N'-propyleneurea or N-(6-thiohexyl)-N,N'-propyleneurea.

"Propyleneurea" may stand both for "1,2-propyleneurea" and for "1,3-propyleneurea".

The compounds c) preferably comprise O-(2-hydroxyethyl) carbamate, O-(2-hydroxypropyl)carbamate, O-(3-hydroxypropyl) carbamate, O-(4-hydroxybutyl) carbamate, O-(6-hydroxyhexyl) carbamate, O-(2,2-di(hydroxymethyl)propyl)carbamate, O-(2-hydroxyethyl)N-methylcarbamate, O-(2-hydroxypropyl) N-methyl-carbamate, O-(2-hydroxyethyl)N-ethylcarbamate, N-(2-hydroxyethyl)urea, N-(2-hydroxypropyl)urea, N-(3-hydroxypropyl)urea, N-(4-hydroxybutyl)urea, N-(6-hydroxyhexyl)urea, N-(2-hydroxyethyl)-N'-methylurea, N-(2-hydroxypropyl)-N'-methylurea, N-(3-hydroxypropyl)-N'-methylurea, N-(4-hydroxybutyl)-N'-methylurea or N-(6-hydroxyhexyl)-N'-methylurea, and with particular preference O-(2-hydroxyethyl)carbamate, O-(2-hydroxypropyl) carbamate or O-(4-hydroxybutyl)carbamate.

Suitable components d) include compounds having at least one isocyanate-reactive group and at least one dispersing group.

Such compounds are represented for example by the formula $$RG-R^3-DG$$

where

RG is at least one isocyanate-reactive group,

DG is at least one dispersing group, and $R^3$ is an aliphatic, cycloaliphatic or aromatic radical containing from 1 to 20 carbon atoms.

Examples of RG are —OH, —SH, —NH$_2$ or —NHR$^4$, in which R$^4$ is as defined above but may be different from the radical used there.

Examples of DG are —COOH, —SO$_3$H or —PO$_3$H and also their anionic forms, with which any desired counterion may be associated, e.g., Li$^+$, Na$^+$, K$^+$, Cs$^+$, Mg$^{2+}$, Ca$^{2+}$, Ba$^{2+}$, ammonium, methylammonium, dimethylammonium, trimethylammonium, ethylammonium, diethylammonium, triethylammonium, tributylammonium, di-iso-propylethylammonium, benzyldimethylammonium, monoethanolammonium, diethanolammonium, triethanolammonium, hydroxyethyldimethylammonium, hydroxyethyldiethylammonium, monopropanolammonium, dipropanolammonium, tripropanolammonium, piperidinium, piperazinium, N,N'-dimethylpiperazinium, morpholinium or pyridinium.

$R^3$ may be, for example, methylene, 1,2-ethylene, 1,2-propylene, 1,3-propylene, 1,2-butylene, 1,4-butylene, 1,3-butylene, 1,6-hexylene, 1,8-octylene, 1,12-dodecylene, 1,2-phenylene, 1,3-phenylene, 1,4-phenylene, 1,2-naphthylene, 1,3-naphthylene, 1,4-naphthylene, 1,6-naphthylene, 1,2-cyclopentylene, 1,3-cyclopentylene, 1,2-cyclohexylene, 1,3-cyclohexylene or 1,4-cyclohexylene.

Component d) preferably comprises, for example, mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxyacetic acid, hydroxypivalic acid, lactic acid, hydroxysuccinic acid, hydroxydecanoic acid, dimethylolpropionic acid, dimethylolbutyric acid, ethylenediaminetriacetic acid, hydroxydodecanoic acid, hydroxyhexacanoic acid, 12-hydroxystearic acid, aminonaphthalenecarboxylic acid, hydroxyethanesulfonic acid, hydroxypropanesulfonic acid, mercaptoethanesulfonic acid, mercaptopropanesulfonic acid, aminomethanesulfonic acid, taurine, aminopropanesulfonic acid, and also their alkali metal, alkaline earth metal or ammonium salts, and with particular preference comprises the specified monohydroxycarboxylic and monohydroxysulfonic acids and also monoaminocarboxylic and monoaminosulfonic acids.

To prepare the dispersion, the abovementioned acids, where not already in salt form, are fully or partly neutralized, preferably using alkali metal salts or amines, preferably tertiary amines.

Suitable components e) include compounds containing at least two isocyanate-reactive groups, examples being —OH, —SH, —NH$_2$ or —NHR$^5$, where R$^5$ has the same meaning as R$^4$ above but may be different from R$^4$.

These compounds are preferably diols or polyols, such as hydrocarbon diols having 2 to 20 carbon atoms, e.g., ethylene glycol, 1,2-propanediol, 1,3-propanediol, 1,1-dimethylethane-1,2-diol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, etc., their esters with short-chain dicarboxylic acids, such as adipic acid, cyclohexanedicarboxylic acid, their carbonates, prepared by reacting the diols with phosgene or by transesterification with dialkyl or diaryl carbonates, or aliphatic diamines, such as methylene- and isopropylidenebis(cyclohexylamine), piperazine, 1,2-, 1,3- or 1,4-diaminocyclohexane, 1,2-, 1,3- or 1,4-cyclohexabis(methylamine), etc., dithiols or polyfunctional alcohols, secondary or primary amino alcohols, such as ethanolamine, diethanolamine, monopropanolamine, dipropanolamine etc., or thioalcohols, such as thioethylene glycol.

Also conceivable are diethylene glycol, triethylene glycol, dipropylene glycol, tripropylene glycol, neopentyl glycol, pentaerythritol, 1,2- and 1,4-butanediol, 1,5-pentanediol, 2-methyl-1,5-pentanediol, 2-ethyl-1,4-butanediol, 1,2-, 1,3- and 1,4-dimethylolcyclohexane, glycerol, trimethylolethane, trimethylolpropane, trimethylolbutane, dipentaerythritol, ditrimethylolpropane, erythritol and sorbitol, 2-aminoethanol, 3-amino-1-propanol, 1-amino-2-propanol or 2-(2-aminoethoxy)ethanol, bisphenol A, or butanetriol.

Also suitable, furthermore, are unsaturated polyetherols or polyesterols or polyacrylate polyols having an average OH functionality of from 2 to 10, and also polyamines, such as polyethyleneimine or polymers of, for example, poly-N-vinylformamide containing free amine groups.

Particularly suitable here are the cycloaliphatic diols, such as bis(4-hydroxycyclohexane)isopropylidene, tetramethylcyclobutanediol, 1,2-, 1,3- or 1,4-cyclohexanediol, cyclooctanediol or norbornanediol, for example.

Suitable components f) include compounds containing at least one isocyanate-reactive group. These compounds may, for example, be monoalcohols, mercaptans or monoamines containing 1 to 20 carbon atoms, e.g., methanol, ethanol, iso-propanol, n-propanol, n-butanol, iso-butanol, sec-butanol, tert-butanol, ethylene glycol monomethyl ether, ethylene glycol monoethyl ether, diethylene glycol monomethyl ether, diethylene glycol monoethyl ether, 1,3-propanediol monomethyl ether, 1,2-propanediol monoethyl ether, 1,2-propanediol monomethyl ether, n-hexanol, n-heptanol, n-octanol, n-decanol, n-dodecanol, 2-ethylhexanol, cyclopentanol, cyclohexanol, cyclooctanol, cyclododecanol, triethylene glycol monomethyl ether, triethylene glycol monoethyl ether, n-pentanol, stearyl alcohol, cetyl alcohol, lauryl alcohol, cyclopent-2-en-1-ol, cyclopent-3-en-1-ol, cyclohex-2-en-1-ol, allyl alcohol, methylamine, ethylamine, iso-propylamine, n-propylamine, n-butylamine, iso-butylamine, sec-butylamine, tert-butylamine, n-pentylamine, n-hexylamine, n-heptylamine, n-octylamine, n-decylamine, n-dodecylamine, 2-ethylhexylamine, stearylamine, cetylamine, laurylamine, dimethylamine, diethylamine, di-n-propylamine, di-iso-propylamine, di-n-butylamine, dihexylamine, dioctylamine, ethylmethylamine, iso-propylmethylamine, n-butylmethylamine, tert-butylmethylamine, iso-propylethylamine, n-butylethylamine, tert-butylethylamine, cyclopentylamine, cyclohexylamine, cyclooctylamine, cyclododecylamine, morpholine, piperidine, pyrrolidine, N-methylpiperazine, monoethanolamine, diethanolamine, monopropanolamine, dipropanolamine, methanethiol, ethanethiol, iso-propanethiol, n-propanethiol, n-butanethiol, iso-butanethiol, sec-butanethiol or tert-butanethiol.

Suitable components (B) include those compounds which are able to crosslink with carbamates. Reactive groups of this kind include active methylol or alkylalkoxy groups, especially methylalkoxy groups, on amino resin crosslinkers, such as etherified reaction products of formaldehyde with amines, such as melamine, urea etc., phenol/formaldehyde adducts, siloxane or silane groups, and anhydrides, as are described, for example, in U.S. Pat. No. 5,770,650.

Among the industrially widespread and widely known, preferred amino resins it is possible with particular preference to use urea resins and melamine resins, such as urea-formaldehyde resins, melamine-formaldehyde resins, melamine-phenol-formaldehyde resins or melamin-urea-formaldehyde resins, for example.

Suitable urea resins are those obtainable by reacting ureas with aldehydes, and which may if desired be modified.

Suitable ureas include urea, N-substituted ureas or N,N'-disubstituted ureas, such as N-methylurea, N-phenylurea, N,N'-dimethylurea, hexamethylenediurea, N,N'-diphenylurea, 1,2-ethylenediurea, 1,3-propylenediurea, diethylenetriurea, dipropylenetriurea, 2-hydroxypropylenediurea, 2-imidazolidinone (ethyleneurea), 2-oxohexahydropyrimidine(propyleneurea) or 2-oxo-5-hydroxyhexahydropyrimidine(5-hydroxypropyleneurea).

Particularly suitable aldehydes include formaldehyde, acetaldehyde, iso-butyraldehyde, and glyoxal.

Urea resins may if desired by partly or fully modified, modification taking place, for example, by reaction with monofunctional or polyfunctional alcohols, ammonia and/or amines (cationically modified urea resins) or with (hydrogen) sulfites (anionically modified urea resins); in accordance with the invention, the alcohol-modified urea resins are particularly suitable.

Suitable modifying alcohols include $C_1$–$C_6$ alcohols, preferably $C_1$–$C_4$, and especially methanol, ethanol, iso-propanol, n-propanol, n-butanol, iso-butanol, and sec-butanol.

Suitable melamine resins are those obtainable by reacting melamine with aldehydes, and they may if desired by partly or fully modified.

Melamine-formaldehyde resins are products of the reaction of melamine with aldehydes, examples being the aldehydes mentioned above, especially formaldehyde. If desired, the methylol groups obtained may be modified by etherification with the abovementioned monohydric or polyhydric alcohols. Additionally, the melamine-formaldehyde resins may also be modified as described above by reaction with amines, aminocarboxylic acids or sulfites.

The action of formaldehyde on mixtures of melamine and urea or on mixtures of melamine and phenol produces melamine-urea-formaldehyde resins or, respectively, melamin-phenol-formaldehyde resins which may likewise be used in accordance with the invention.

The abovementioned amino resins are prepared by conventional techniques.

Examples mentioned particularly are melamin-formaldehyde resins, including monomeric or polymeric melamine resins and fully or partly alkylated melamine resins, urea resins, e.g., methylolureas such as formaldehyde-urea resins, alkoxyureas such as butylated formaldehyde-urea resins, and also N-methylolacrylamide emulsions, iso-butoxymethylacrylamide emulsions, polyanhydrides, such as polysuccinic anhydride, and siloxanes or silanes, e.g., dimethyldimethoxysilanes.

Particular preference is given to amino resins such as melamin-formaldehyde resins or formaldehyde-urea resins.

Likewise preferred are amino resins in which one or more amino groups have been substituted by carbamate groups, as described in U.S. Pat. No. 5,300,328.

As photoinitiators (C) it is possible to use photoinitiators known to the skilled worker, examples being those referred to in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (Ed.), SITA Technology Ltd, London.

Suitable examples include mono- or bisacylphosphine oxides, as described for example in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO), ethyl 2,4,6-trimethylbenzoylphenylphosphinate, benzophenones, hydroxyacetophenones, phenylglyoxylic acid and its derivatives, or mixtures of these photoinitiators. Examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarbonylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, benzoin iso-butyl ether, chloroxanthenone, benzoin tetrahydropyranyl ether, benzoin methyl ether, benzoin ethyl ether, benzoin butyl ether, benzoin iso-propyl ether, 7H-benzoin methyl ether, benzo[de]anthracen-7-one, 1-naphthaldehyde, 4,4'-bis(dimethylamino)benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, o-methoxybenzophenone, triphenylphosphine, tri-o-tolylphosphine, benzo[a]anthracene-7,12-dione, 2,2-diethoxyacetophenone, 2,2-dimethoxy-2-phenylacetophenone, benzil ketals, such as benzil dimethyl ketal, 2-methyl-1-[4-(methylthio)phenyl]-2-morpholinopropan-1-one, and 2,3-butanedione.

Particularly suitable are nonyellowing or low-yellowing photoinitiators of the phenylglyoxalic ester type, as described in DE-A 198 26 712, DE-A 199 13 353 or WO 98/33761.

Examples of further typical coatings additives (D) which may be used include antioxidants, stabilizers, activators (accelerators), fillers, pigments, dyes, antistats, flame retardants, thickeners, thixotropic agents, surface-active agents, viscosity modifiers, plasticizers or chelating agents.

As accelerators for the thermal aftercure it is possible, for example, to use tin octoate, zinc octoate, dibutyltin dilaurate or diaza[2.2.2]bicyclooctane.

It is also possible to add one or more initiators which can be activated photochemically and/or thermally, examples being potassium peroxodisulfate, dibenzoyl peroxide, cyclohexanone peroxide, di-tert-butyl peroxide, azobis-isobutyronitrile, cyclohexylsulfonylacetyl peroxide, di-iso-propyl percarbonate, tert-butyl peroctoate or benzpinacol, and also, for example, those initiators which can be activated thermally and have a half-life at 80° C. of more than 100 hours, such as di-t-butyl peroxide, cumene hydroperoxide, dicumyl peroxide, t-butyl perbenzoate, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Other examples of suitable initiators are described in "Polymer Handbook", 2nd ed., Wiley & Sons, New York.

Suitable thickeners include not only free-radically (co) polymerized (co)polymers but also customary organic and inorganic thickeners such as hydroxymethylcellulose or bentonite.

Chelating agents which can be used include, for example, ethylenediamineacetic acid and its salts and also β-diketones.

Suitable fillers include silicates, examples being silicates obtainable by hydrolyzing silicon tetrachloride, such as Aerosil® from Degussa, siliceous earth, talc, aluminum silicates, magnesium silicates, calcium carbonates etc.

Suitable stabilizers embrace typical UV absorbers such as oxanilides, triazines, and benzotriazole (the latter obtainable as Tinuvin® grades from Ciba-Spezialitätenchemie) and benzophenones. These may be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6, 6-tetramethyl-4-piperidyl)sebacate. Stabilizers are commonly used in amounts of from 0.1 to 5.0% by weight, based on the solid components present in the formulation.

The polyurethanes (A) of the invention are obtained by reacting components a), b), and c) with one another.

The molar composition a):b):c) per 3 mol of reactive isocyanate groups in a) is generally as follows:

b) 0.1–2.9, preferably 0.5–2.8, with particular preference 1.0–2.5, and in particular 1.5–2.5 mol of isocyanate-reactive groups, and c) 2.9–0.1, preferably 0.2–2.5, with particular preference 0.5–2.0 and in particular 0.5–1.5 mol of isocyanate-reactive groups.

Following reaction of components a), b) and c) the polyurethane (A) may still contain free isocyanate groups; preferably, however, more than 70% of the isocyanate groups present in a) before reaction have been consumed by reaction, with particular preference more than 80%, with very particular preference more than 90%, and in particular more than 95%.

For use of the polyurethanes in aqueous systems, it is preferred for substantially all of the isocyanate groups present to have been consumed by reaction.

The composition of the polyurethane dispersions of the invention is as follows (per mole of reactive isocyanate group in the polyurethane (A))

d) 1–30 mol %, preferably 2–20 mol %, with particular preference 3–15 mol %, and in particular 5–10 mol % of isocyanate-reactive groups, e) 0–50 mol %, preferably 5–40 mol %, with particular preference 10–30 mol %, and in particular 15–25 mol % of isocyanate-reactive groups, f) 0–50 mol %, preferably 5–40 mol %, with particular preference 10–30 mol %, and in particular 15–25 mol % of isocyanate-reactive groups, (B) per mole of carbamate or urea end group present in the polyurethane (A), 1–5 mol of compound (B), with particular preference 1–3 mol, with very particular preference 1.1–2.5 mol, and in particular 1.5–2 mol of groups which are reactive toward carbamate or urea end groups, (C) based on the overall weight, the finished polyurethane dispersion may contain 0–10% by weight of (C), preferably 1–8% by weight, with particular preference 2–7% by weight, and in particular 3–5% by weight, and also (D) based on the overall weight, the finished dispersion may contain 0–50% by weight of components (D), preferably 5–40% by weight, with particular preference 10–30% by weight, and in particular 15–25% by weight.

The adduct formed from isocyanato-containing compound and the compound containing groups that are reactive toward isocyanate groups is generally formed by mixing the components in arbitrary order, at elevated temperature if desired.

It is preferred to add the compound which contains groups that are reactive toward isocyanate groups to the isocyanato-containing compound, preferably in two or more steps.

With particular preference, the isocyanato-containing compound is introduced initially and the compounds containing groups that are reactive toward isocyanate are added. In particular, the isocyanato-containing compound a) is introduced initially and then b) and, subsequently, c) are added. Thereafter, it is possible, if desired, to add further desired components.

In general, the reaction is conducted at temperatures between 5 and 100° C., preferably between 20 and 90° C., with particular preference between 40 and 80° C. and in particular between 60 and 80° C.

For this reaction it is preferred to operate under anhydrous conditions.

Anhydrous means here that the water content of the reaction system is not more than 5% by weight, preferably not more than 3% by weight, and with particular preference not more than 1% by weight.

The reaction is preferably conducted in the presence of least one suitable inert gas, e.g., nitrogen, argon, helium, carbon dioxide or the like.

The reaction may also be conducted in the presence of an inert solvent, e.g., acetone, iso-butyl methyl ketone, toluene, xylene, butyl acetate or ethoxyethyl acetate. Preferably, however, the reaction is conducted in the absence of a solvent.

The polyurethanes of the invention are particularly suitable as binders, e.g., in coating materials, paints or varnishes.

The polyurethanes and polyurethane dispersions of the invention may be used with preference as coating materials. For this purpose they are admixed where necessary with components (B) and also, where appropriate (C) and, where appropriate, (D).

The substrates are coated by conventional techniques that are known to the skilled worker, involving the application of at least one dispersion or coating formulation of the invention to the target substrate in the desired thickness and the removal of the volatile constituents of the dispersions, where appropriate with heating. If desired, this operation may be repeated one or more times. Application to the substrate may take place in conventional manner, e.g., by spraying, troweling, knife coating, brushing, rolling, roller coating, or flow coating. The coating thickness is generally situated within a range from about 3 to 1 000 g/m$^2$ and preferably from 10 to 200 g/m$^2$.

Also disclosed is a method of coating substrates, which involves adding, where appropriate, further typical coating additives and thermally curable resins to the polyurethane of the invention, the polyurethane dispersions of the invention, or coating formulations, applying them to the substrate and, if desired, drying them, curing them with electron beams or UV exposure under an oxygen-containing atmosphere or, preferably under inert gas, where appropriate at temperatures up to the level of the drying temperature, and then subjecting them to thermal treatment at temperatures up to 160° C., preferably between 60 and 160° C.

The method of coating substrates may also be implemented by first applying the polyurethanes or polyurethane dispersions or coating formulations of the invention and then subjecting them to thermal treatment at temperatures up to 160° C., preferably between 60 and 160° C., and then curing them with electron beams or by UV exposure under oxygen or, preferably, under inert gas.

If desired, the films that are formed on the substrate may be cured by means of heat alone. In general, however, the coatings are cured both by exposure to high-energy radiation and thermally.

If two or more films of the coating material are applied one above the other, it is possible if desired for a thermal and/or radiation cure to take place following each coating operation.

Examples of suitable radiation sources for the radiation cure include low, medium and high pressure mercury lamps and also fluorescent tubes, pulsed emitters, metal halide lamps, electronic flash devices, by means of which radiation curing without a photoinitiator is possible, or excimer lamps. Radiation curing is effected by exposure to high-energy radiation, i.e., UV radiation or daylight, preferably light in the wavelength range from λ=200 to 700 nm, with particular preference from λ=200 to 500 nm, and with very particular preference from λ=250 to 400 nm, or by irradiation with high-energy electrons (electron beams; 150 to 300 kev). Examples of radiation sources used include high pressure mercury vapor lamps, lasers, pulsed lamps (flashlight), halogen lamps or excimer lamps. The radiation dose normally used for crosslinking in the UV cure is in the range from 80 to 3 000 mJ/cm$^2$.

It is of course also possible to use two or more raddiation sources for the cure, e.g., from two to four.

It is also possible for these sources each to emit in different wavelength ranges.

If desired, irradiation may also be conducted in the absence of oxygen, e.g., under an inert gas atmosphere. Suitable inert gases preferably include nitrogen, noble gases, carbon dioxide, or combustion gases. Irradiation may further take place by the coating material being covered with transparent media. Examples of transparent media include polymer films, glass or liquids, e.g., water. Particular preference is given to irradiation in the manner described in DE-A 199 57 900.

The invention additionally provides a method of coating substrates which involves i) coating a substrate with a dispersion, as described above, ii) removing volatile constituents of the dispersion to form a film, under conditions in which the initiator (C) does not yet substantially form any free radicals, iii) if desired, exposing the film formed in step ii) to high-energy radiation, the film undergoing initial curing, and then, if desired, mechanically working the article coated with the precured film or contacting the surface of the precured film with another substrate, iv) finally curing the film thermally.

Steps iv) and iii) may also be carried out in the opposite order; in other words, the film may be cured first thermally and then with high-energy radiation.

The dispersions and coating formulations of the invention are particularly suitable for the coating of substrates such as wood, paper, textile, leather, nonwoven, plastics surfaces, glass, ceramic, mineral building materials, such as cement slabs and fiber cement panels, or metals or coated metals, preferably of plastics or metals.

With particular preference the dispersions of the invention are suitable as or in exterior coatings, i.e., applications involving exposure to daylight; preferably of buildings or parts of buildings, interior coatings, traffic markings, coatings on vehicles and aircraft. In particular, the dispersions of the invention are used as or in automotive clearcoat and topcoat materials.

The storage stability of the compositions of the invention is greater than that of their prior art counterparts on account of the fact that the compositions of the invention substantially contain only urea end groups and carbamate end groups bonded via the oxygen atom, but do not contain the highly reactive end groups which are otherwise the norm.

The only products which arise in the course of a cure are low-boiling, i.e., volatile, alcohols or amines, examples being the residues $R_1$—$NH_2$ or $R^2$—$NH_2$ in c) or the alcohols used as ethers in a melamine or urea resin.

The examples which follow are intended to illustrate the properties of the invention without, however, restricting it.

EXAMPLES

In this document all parts are to be understood as meaning parts by weight unless specified otherwise.

The pendulum hardness is determined in accordance with DIN 53157 on a glass plate substrate. It is a measure of the hardness of a coating. High pendulum hardness values represent a high coating hardness.

Example 1

Preparation of the Polyisocyanato Acrylate:

Hexamethylene diisocyanate (HDI) was introduced under nitrogen blanketing and 50 mol % (relative to isocyanate) of stabilized hydroxyethyl acrylate was added. The mixture was heated to 80° C. and 200 ppm by weight (based on the diisocyanate) of the catalyst N,N,N-trimethyl-N-(2-hydroxypropyl)ammonium 2-ethylhexanoate were added. The temperature rose slowly to 120° C. Reaction was allowed to take place at this temperature and was stopped when the mixture had an NCO content of 16.8% by weight by adding 250 ppm by weight (based on the diisocyanate) of di-2-ethylhexyl phosphate. The reaction mixture was subsequently freed from unreacted HDI in a thin-film evaporator at 135° C. and 2.5 mbar.

The NCO content following distillation was 11.8% by weight, the viscosity at 23° C. was 1 640 mPas.

Further Processing:

200 parts of this polyisocyanato acrylate containing urethane and allophanate groups are reacted with 68 parts of hydroxypropyl carbamate (Carbalink® HPC, Huntsman Corp.) in the presence of 0.05 part of dibutyltin dilaurate, 0.13 part of hydroquinone monomethyl ether and 0.27 part of 2,6-di-tert-butyl-p-cresol. The temperature rises to 85° C. The mixture is then stirred at 75° C. for 5 hours. The product is highly viscous. The original NCO content of 11.8% has fallen to 0.1%.

Example 2

Preparation of a Dual-cure Polyurethane Acrylate Dispersion:

200 parts of the polyisocyanato acrylate from example 1, containing urethane and allophanate groups and having an NCO content of 11.8%, are reacted in a stirred tank with 20.6 parts of 2,2-bis(4-hydroxycyclohexyl)propane and 20.4 parts of hydroxypropyl carbamate (Carbalink® HPC, Huntsman Corp.) in the presence of 0.25 part of 2,6-di-t-butyl-p-cresol, 0.12 part of hydroquinone monomethyl ether and 0.5 part of dibutyltin dilaurate, the temperature rising to 85° C., and then stirred at 60° C. for 5 hours. The NCO value is 1.7%.

Then 3.8 parts of thioglycolic acid and 6.7 parts of hydroxyethyl acrylate are added and stirring is continued at 65° C. for 4 hours. The residual NCO value is 0.18%. The product is neutralized with 4.6 parts of triethylamine, 1.5 parts of methanol are added, and the mixture is stirred at room temperature for 1.5 hours. It is then dispersed in water.

Example 3

Dual Cure Coating Material

To 20 parts of binder from example 1) there are added 3.7 parts of Luwipal® 066, a commercially available methanol-etherified melamine resin from BASF AG, 2 parts of a photoinitiator mixture of 3.5 parts Irgacure® 184 (Ciba) and 0.5 part Lucirin® TPO (BASF).

Production of Films

The coating material is applied to different substrates in film thicknesses of approximately 40 μm and is treated as follows: it is irradiated using 2 UV lamps (each 80 W/cm)

on a conveyor belt at the stated speed and then heated in a gradient oven for the times and at the temperatures indicated.

The applied coating film is liquid and tacky (pendulum hardness <5 s). Following exposure at 2*5 m/min under the IST exposure unit and 5 min heating at 120° C., the pendulum hardness increases to 110 s, and after 30 min heating it increases to 130 s.

Example 4
Dual Cure Coating Material from a Dispersion

To 50 parts of dispersion from example 2) there are added 5 parts of Luwipal® 066, a commercially available methanol-etherified melamine resin from BASF AG, 2 parts of a photoinitiator mixture of 3.5 parts Irgacure® 184 (Ciba) and 0.5 part Lucirin® TPO (BASF).

Production of Films

The dispersion is applied to different substrates in film thicknesses of approximately 40 µm and is treated as follows: it is irradiated using 2 UV lamps (each 80 W/cm) on a conveyor belt at the stated speed and then heated in a gradient oven for the times and at the temperatures indicated.

The applied coating film is liquid and tacky (pendulum hardness <5 s). Following exposure at 2*5 m/min under the IST exposure unit and 5 min heating at 120° C., the pendulum hardness increases to 125 s, and after 30 min heating it increases to 142 s.

We claim:

1. A polyurethane (A), comprising as constituent components:
   a) at least one organic aliphatic or cycloaliphatic allophanate group containing polyisocyanate,
   b) at least one compound having at least one isocyanate-reactive group and at least one free-radically polymerizable unsaturated group andlor a cationically polymerizable group,
   c) at least one compound having at least one isocyanate-reactive group and a carbamate or urea end group,
   d) optionally, at least one compound containing at least one isocyanate-reactive group and at least one dispersing group,
   e) optionally, at least one compound containing at least two isocyanate-reactive groups, and
   f) optionally, compounds other than a) to d) containing at least one isocyanate-reactive group.

2. The polyurethane as claimed in claim 1, further comprising:
   (B) at least one compound containing at least one group that can crosslink with the carbamate groups.

3. A polyurethane dispersion, comprising;
   (A) a polyurethane as claimed in claim 1, wherein component d) is present,
   (B) at least one compound containing at least one group that can crosslink with the carbamate groups,
   (C) optionally; one or more initiators which can be activated photochemically and/or thermally, and
   (D) optionally, further typical coatings additives.

4. A coating material comprising a polyurethane dispersion as claimed in claim 3.

5. A polyurethane as claimed in claim 2, wherein component (B) comprises at least one amino resin.

6. A method of coating substrates, which comprises:
   radiation-curing a substrate coated with a material comprising the polyurethane as claimed in claim 1 and heat-treating the coated substrate at temperatures up to 160° C.

7. The method as claimed in claim 6, wherein the heat treatment takes place at a temperature ranging from 60 to 160° C.

8. The method as claimed in claim 6, wherein the radiation curing is carried out under inert gas.

9. A binder comprising the polyurethane as claimed in claim 1.

10. A material for coating metals or plastics comprising the polyurethane as claimed in claim 1.

11. An automotive paint or automotive topcoat comprising the polyurethane as claimed in claim 1.

12. A coating material comprising:
    a polyurethane (A) as claimed in claim 1,
    (B) at least one compound having at least one group that can crosslink with the carbamate groups,
    (C) optionally, one or more initiators which can be activated photochemically and/or thermally, and
    (D) optionally, further typical coatings additives.

13. The polyurethane as claimed in claim 1, wherein said at least one
    organic aliphatic or cycloaliphatic allophanate group containing polyisocyanate is prepared by reacting excess amounts of hexamethylene diisocyanate or of isophorone diisocyanate with a polyhydric alcohol selected from the group consisting of trimethylolpropane, neopentyl glycol, pentaerythritol, 1,4-butanediol, 1,6-hexanediol, 1,3-propanediol, ethylene glycol, diethylene glycol, glycerol, 1,2-dihydroxypropane and mixtures thereof such that the allophonate has an NCO content ranging from 12 to 20% by weight and an average NCO functionality of 2.5 to 3.

14. The polyurethane as claimed in claim 1, wherein, per 100 g of compound (b), the compound contains at least 0.01 mol of unsaturated free-radically or cationically polymerizable groups, and, per 100 g of compound (c), the compound contains at least 0.01 mol of carbamate or urea end groups.

15. The polyurethane as claimed in claim 1, wherein compound (d) has the formula: $RG-R^3-DG$,
    wherein RG is at least one isocyanate-reactive group selected from the group consisting of —OH, —SH, —NH$_2$ and —NHR$^4$, wherein R$^4$ is hydrogen or an alkyl group containing 1 to 4 carbon atoms;
    DG is at least one dispersing group selected from the group consisting of —COOH, —SO$_3$H, —PO$^3$H and the anionic forms of these groups; and
    R$^3$ is an aliphatic, cycloaliphatic or aromatic radical containing from 1 to 20 carbon atoms.

16. The polyurethane as claimed in claim 1, wherein compound (b) is a carbamate compound of the formula: R—O—(CO)—NH—R$^1$ or a urea compound of the formula:
    R—(NR$^1$)—(CO)—NN—R$^2$, wherein
    R is an aliphatic, cycloaliphatic or aromatic radical of 2 to 20 carbon atoms containing at least one isocyanate-reactive group selected from the group consisting of —OH, —SH, —NH$_2$ and —NHR$^4$, wherein R$^4$ is hydrogen or an alkyl group containing 1 to 4 carbon atoms; and
    R$^1$, R$^2$ and R$^4$ independently of each other are hydrogen or an alkyl group containing 1 to 4 carbon atoms.

17. The polyurethane as claimed in claim 1, wherein components a):b):c) are present in a molar ratio amount, per three mole amount of reactive isocyanate group in (a) is:
    b) 0.1 to 2.9, and c) 2.9to 0.1.

18. The polyurethane as claimed in claim 17, wherein components a):b):c) are present in a molar ratio amount, per three mole amount of reactive isocyanate group in (a) is:
    b) 0.5 to 2.8, and c) 0.2 to 2.5.

* * * * *